United States Patent
Bakshi et al.

(10) Patent No.: US 6,311,215 B1
(45) Date of Patent: *Oct. 30, 2001

(54) SYSTEM FOR DYNAMIC DETERMINATION OF CLIENT COMMUNICATIONS CAPABILITIES

(75) Inventors: Bikram Singh Bakshi, Hillsboro; Robert Conrad Knauerhase, Portland; Michael Man-Hak Tso, Hillsboro, all of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,294

(22) Filed: Dec. 31, 1997

Related U.S. Application Data (60) Provisional application No. 60/042,070, filed on Mar. 25, 1997.

(51) Int. Cl.[7] ................................................. G06F 15/177
(52) U.S. Cl. ........................ 709/221; 709/236; 707/513
(58) Field of Search .................................. 709/203, 236, 709/225, 229, 217, 232, 250, 246, 227, 221, 329, 228; 379/201; 370/401, 62, 466, 252, 437; 380/49, 4, 25; 713/201; 395/182.04; 717/11, 5; 707/203, 513

(56) References Cited

U.S. PATENT DOCUMENTS

| | | | |
|---|---|---|---|
| 4,509,167 | * 4/1985 | Bantel et al. | 370/62 |
| 5,373,375 | 12/1994 | Weldy | 358/523 |
| 5,513,314 | * 4/1996 | Kandasamy et al. | 395/182.04 |
| 5,517,612 | 5/1996 | Dwin et al. | 395/166 |
| 5,544,320 | 8/1996 | Konrad | 395/200.09 |

(List continued on next page.)

OTHER PUBLICATIONS

Armando Fox and Eric A. Brewer, "Reducing WWW Latency and Bandwidth Requirements by Real–Time Distillation," Fifth International World Wide Web Conference, May 6–10, 1996.

Armando Fox et al., Adapting to Network and Client Variability via On–Demand Dynamic Distillation, University of Cal. at Berkeley, Sep. 1996.

Primary Examiner—Mehmet B. Geckil
Assistant Examiner—Thong Vu
(74) Attorney, Agent, or Firm—Kenyon & Kenyon

(57) ABSTRACT

A system for determining whether an entity that issued a message is pre-configured to receive a response according to an enhanced communications protocol is implemented in a method which includes the steps of receiving a message and parsing the message to selectively classify the entity as an enhanced entity if the message conforms to the enhanced communications protocol.

15 Claims, 5 Drawing Sheets

U.S. PATENT DOCUMENTS

| | | | |
|---|---|---|---|
| 5,608,874 | * 3/1997 | Ogawa et al. | 709/246 |
| 5,673,322 | * 9/1997 | Pepe et al. | 380/49 |
| 5,684,969 | 11/1997 | Ishida | 395/342 |
| 5,701,451 | 12/1997 | Rogers et al. | 395/600 |
| 5,706,434 | 1/1998 | Kremen et al. | 395/200.09 |
| 5,724,355 | * 3/1998 | Bruno et al. | 370/401 |
| 5,724,556 | 3/1998 | Souder et al. | 395/500 |
| 5,727,159 | 3/1998 | Kikinis | 395/200.76 |
| 5,742,905 | 4/1998 | Pepe et al. | 455/461 |
| 5,764,645 | * 6/1998 | Bernett et al. | 370/466 |
| 5,768,510 | 6/1998 | Gish | 395/200.33 |
| 5,781,729 | * 7/1998 | Baker et al. | 709/203 |
| 5,790,664 | * 8/1998 | Coley et al. | 380/4 |
| 5,805,735 | 9/1998 | Chen et al. | 382/239 |
| 5,812,552 | * 9/1998 | Arora et al. | 370/401 |
| 5,826,014 | * 10/1998 | Coley et al. | 713/201 |
| 5,828,832 | * 10/1998 | Holden et al. | 395/187.01 |
| 5,832,228 | * 11/1998 | Holden et al. | 709/225 |
| 5,835,911 | * 11/1998 | Nkagawa et al. | 707/203 |
| 5,862,223 | * 1/1999 | Walker et al. | 380/25 |
| 5,894,557 | * 4/1999 | Bade et al. | 709/228 |
| 5,915,008 | * 6/1999 | Dulman | 379/201 |
| 5,916,305 | * 6/1999 | Sikdar et al. | 709/236 |
| 5,956,483 | * 9/1999 | Grate et al. | 709/203 |
| 5,958,016 | * 9/1999 | Chang et al. | 709/229 |
| 5,963,731 | * 10/1999 | Sagawa et al. | 709/227 |
| 5,999,979 | * 12/1999 | Vellanki et al. | 709/232 |
| 6,049,671 | * 4/2000 | Slivka et al. | 717/11 |
| 6,073,168 | * 6/2000 | Mighdoll et al. | 709/217 |
| 6,088,803 | * 7/2000 | Tso et al. | 713/201 |
| 6,101,328 | * 8/2000 | Bakshi et al. | 717/11 |
| 6,101,509 | * 8/2000 | Hanson et al. | 707/513 |
| 6,215,774 | * 4/2001 | Knauerhase et al. | 370/252 |
| 6,237,031 | * 5/2001 | Knauerhase et al. | 709/221 |

* cited by examiner

SYSTEM FOR DYNAMIC DETERMINATION OF CLIENT COMMUNICATIONS CAPABILITIES

This application claims the benefit of U.S. Provisional Application No. 60/042,070 titled "Method for Dynamic Determination of Client Communications Capabilities," filed Mar. 25, 1997 by Biker S. Bakes et al. And assigned to Intel Corporation, the disclosure of which is expressly incorporated herein by reference.

BACKGROUND OF THE INVENTION

1. Field of the Invention

The present invention relates generally to the field of computer networking, and in particular to a method for dynamically determining a communications capability of an entity such as a client device.

2. Related Art

It is known to deploy a proxy server, or network proxy, as an intermediary between one or more client computers and an external network such as the Internet. Network proxies are described generally in Ian S. Graham, *HTML Source Book: A Complete Guide to HTML 3.0* (2d ed. 1996). One common application for a network proxy is in conjunction with so-called "firewall" software to protect a LAN (local area network) from unauthorized access over the Internet. A firewall, typically installed on a gateway computer that links the LAN to the external world, restricts externally-originated TCP/IP (Transmission Control Protocol/Internet Protocol) network packets from entering the local network, thereby protecting the LAN from hazards such as unauthorized access. The firewall, however, also prevents network users from directly accessing external resources such as the World-Wide Web ("the Web"). Network proxies are often used to address this shortcoming. See Graham, at 403.

Network proxies are usually configured to have free access to both internal LAN resources and external resources, and can safely pass data back and forth across the firewall. Users may then be given safe, though indirect, access to Web resources by configuring the user's Web browser to reference the network proxy instead of external target servers. When the Web browser is used to retrieve information from outside the firewall it sends a request to the network proxy, which then completes the request and returns the result to the requesting device.

One of the side-effects of using a firewall or other type of network proxy to control a client device's access to the external world is that requests received by a content server, for example, although generated by a client device, will designate the IP (Internet Protocol) address of the network proxy. In other words, the ultimate recipient of the request has no way to determine the IP address of the client device that actually originated the request. This presents a problem for network applications capable of providing services customized according to user-specified preferences. A network device, such as a remote network proxy or content server, cannot reliably use the IP address in a received request to determine such user preferences because many users may be accessing the network device through the same local network proxy.

In view of the foregoing, there is a need for a method by which a network device can dynamically determine the communications capabilities of an entity, such as a client device, in order to, for example, elicit user-specified preferences from that entity.

SUMMARY OF THE INVENTION

According to an embodiment of the present invention, a method is provided for determining whether a device that issued a message is pre-configured to receive a response according to an enhanced communications protocol. Upon receipt of a message, the message is parsed to selectively classify the device as an enhanced device if the message conforms to the enhanced communications protocol.

DETAILED DESCRIPTION

As noted above, a network device, such as a remote network proxy or content server, cannot always rely upon the IP address in a received request to determine user-specified preferences because many users (or clients) may be accessing the network device through a single local network proxy. One possible solution to the problem of obtaining user-specified preferences from a client device is to use an enhanced communications protocol to transfer information relating to the user-specified preferences. In order to effectively implement such a solution, however, it is useful for a network device to be able to dynamically determine whether the client device is configured to communicate using such an enhanced protocol.

Embodiments of the present invention enable a network device, such as a network proxy or a content server, to determine whether a client device which generated a message is configured to communicate user-controlled parameters relating to, for example, user preferences with respect to scaling or otherwise transcoding network content to be downloaded to the client device. Such embodiments may be advantageously applied to systems which allow network clients to set dynamic preferences at a remote network proxy or content server in order to influence, for example, the quality of content and/or the user-visible latency experienced while accessing network data.

Figure 1:
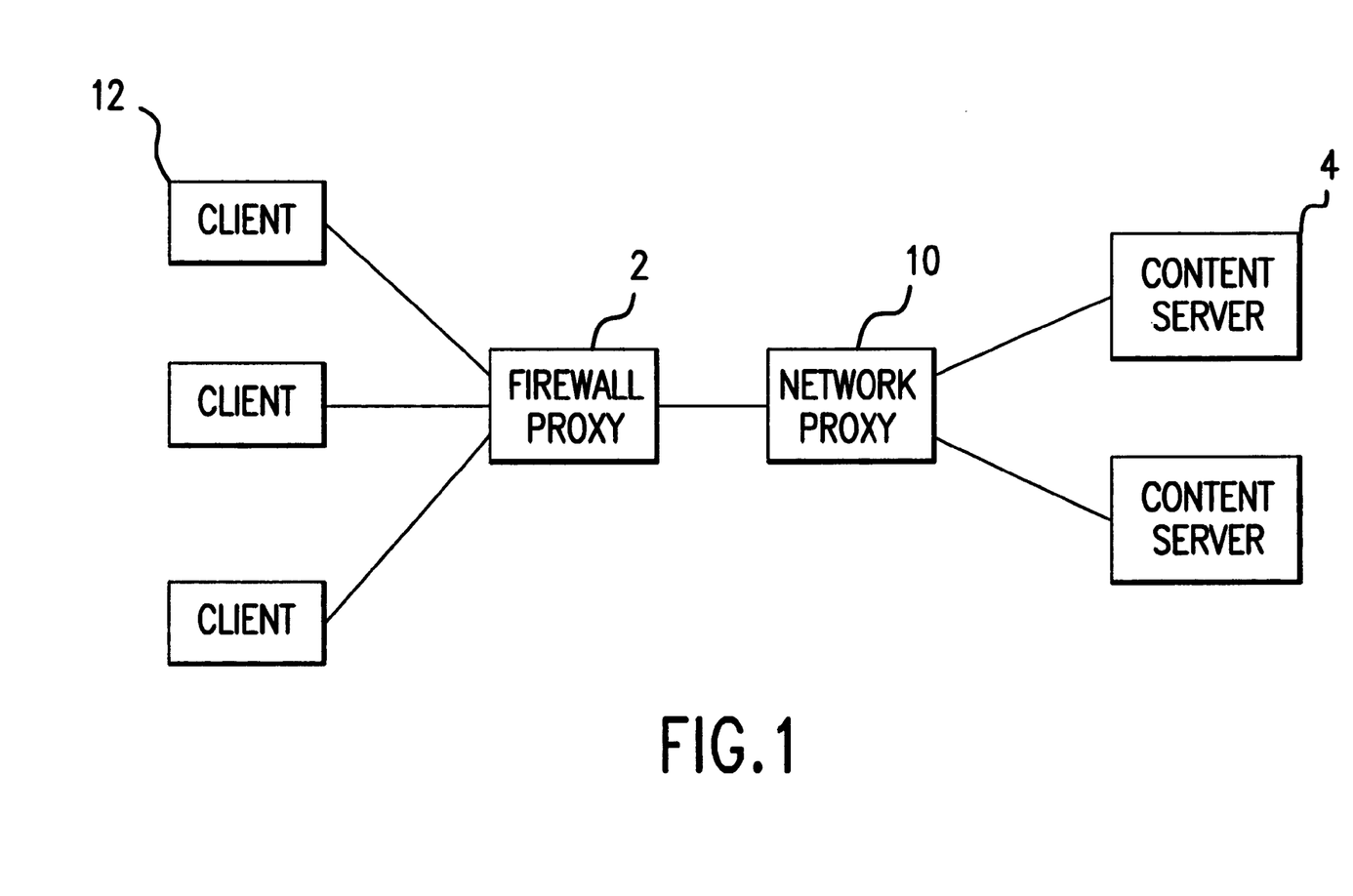
FIG. 1 is a schematic diagram illustrating an embodiment of the present invention.

Referring now to FIG. 1, embodiments of the present invention may be implemented, for example, in an environment in which a plurality of client devices 12 are configured to communicate with external network resources, such as content servers 4, through a firewall proxy 2. In this particular arrangement, a network proxy 10 is configured to intercept messages, such as requests for data objects, from firewall proxy 2 to content servers 4. When client device 12 generates a request for a network object, typically identified by a URL (Uniform Resource Locator), the message is transmitted to firewall proxy 2. Firewall proxy 2 typically reformats the message, replacing the network address of network client 12 with its own network address, and transmits the message to network proxy 10.

In accordance with a first embodiment of the present invention, network proxy 10 may be configured to dynamically ascertain the communications capabilities of network client 12 upon receipt of a message originated by that device. For example, network proxy 10 may parse a received message to determine whether network client 12 is enabled (such as, equipped with pre-installed software to communicate user preferences) or non-enabled (such as, lacking such pre-installed software), as explained further below. In one particular implementation, this determination may be made based upon the format of the message. For example, if a request for an HTML (HyperText Markup Language) document is formatted as a standard "GET HTTP" call, network proxy 10 may be configured to assume that network client 12 is non-enabled; whereas if the request for an HTML document is instead formatted as a "POST HTTP" message including embedded information relating to user preferences, network proxy 10 may be configured to determine that network client 12 is enabled (since a non-enabled client would generally not be configured to generate such "POST HTTP" messages with user preference information). This is just one example of many ways in which network proxy 10 may recognize the use of an enhanced communications protocol by network client 12.

In accordance with such an embodiment, in the case of an enabled client, network proxy 10 may simply extract information relating to user preferences from predetermined locations in the "POST HTTP" message. For a non-enabled client, however, network proxy 12 may perform additional processing to ascertain such user preferences. The additional processing may vary depending upon whether or not network client 12 resides on a secure network, in which case it will communicate with network proxy 10 through firewall proxy 2 as illustrated in FIG. 1.

As noted above, a client device may have at least two different configurations. In the first configuration, referred to as an "enabled client," a special software module is installed on the client device which provides facilities enabling the user to establish download preferences and/or other user-controlled parameters. These user-controlled parameters are then provided to a network device, possibly as part of each subsequent request for network data issued by the client device. In the second configuration, referred to as a "non-enabled client," no special software is installed on the client device. Rather, a piece of dynamic software, such as Java, JavaScript, VBScript or JScript code, is embedded in content provided to the client device by a network device, such as a remote network proxy or a content server. This dynamic software, while not configured to intercept messages from the client device, enables the user to set and/or change download preferences or other user-controlled parameters and transmit those preferences along with the actual network address of the client device to the network device. The network device may then store the preferences, identified by the network address included in the data returned by the client device, and use the preferences to effect subsequent downloads of data to that client device.

Figure 2:
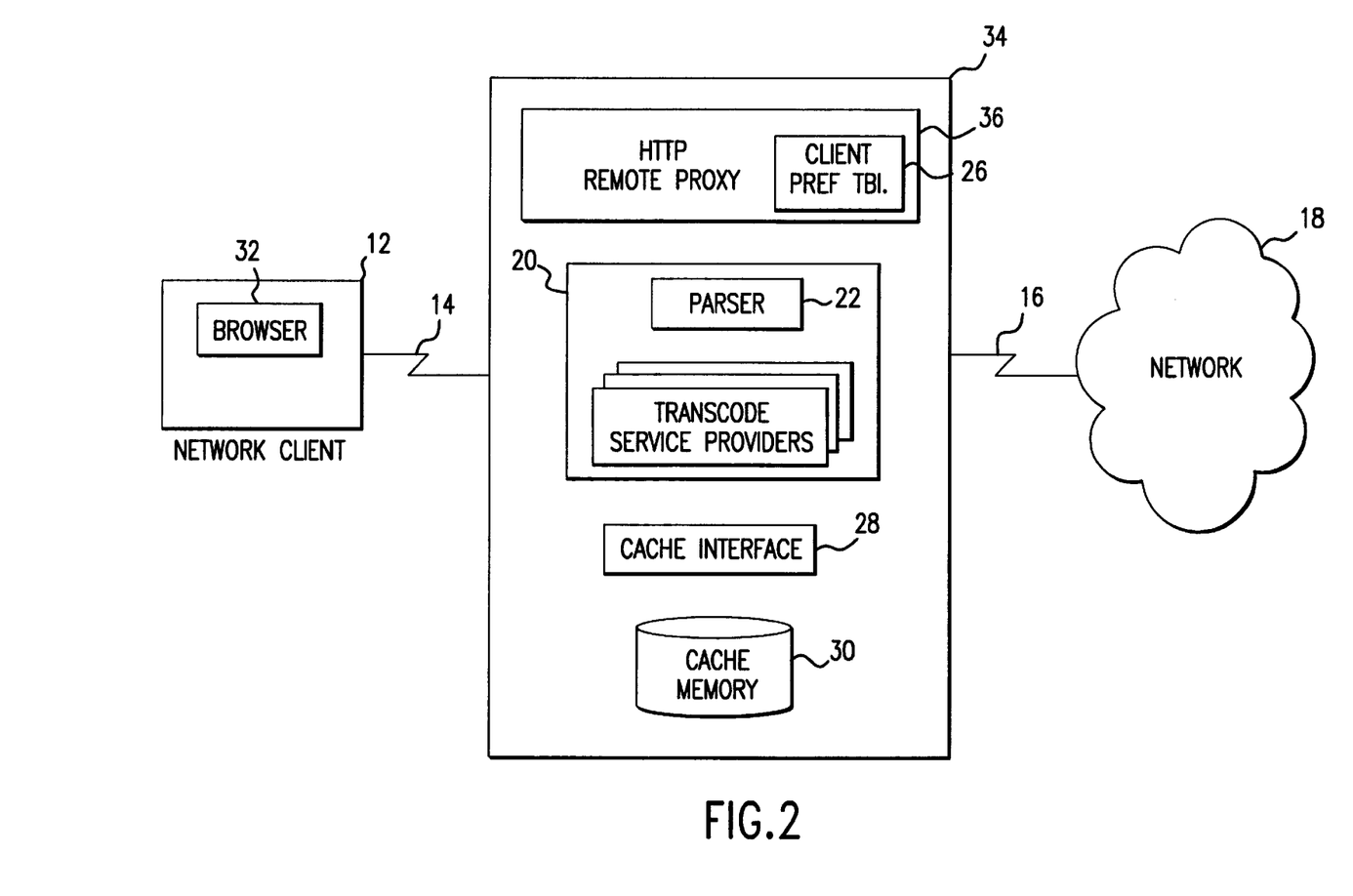
FIG. 2 is a schematic diagram illustrating an arrangement involving a non-enabled network client to which embodiments of the present invention may be applied.

To further illustrate these different types of network clients, FIG. 2 shows an arrangement in which a non-enabled network client 12 communicates with an external network 18 through a transcoding server 34. Network 18 may comprise, for example, the Internet. In this particular arrangement, network client 12 communicates requests for information to, and receives information from, transcoding server 34 over a client/server communications link 14. Transcoding server 34 in turn communicates with computers resident on network 18 through server/network communications link 16. The respective communications links 14, 16 may comprise any suitable communications media known in the art.

Transcoding server 34 may be configured to provide a wide variety of transcoding services to network client 12 and/or network devices, such as content servers, with which network client 12 communicates. In this context, the term "transcode" refers to virtually any type of addition, deletion or modification of data transmitted to or from network client 12 by or through transcoding server 34. Examples of such transcoding services include data compression, image scaling, and dynamic removal of predetermined content. As illustrated in FIG. 2, transcoding server 34 may include a transcoder 20 with a parser 22 and a plurality of transcode service providers 24. Parser 22 is configured to act upon data received by transcoder 20, such as a request for a network object generated by client device 12 or a reply to such a request provided by a content server or other device on network 18. In this particular example, parser 22 is responsible for selectively invoking one or more of transcode service providers 24 based upon a predetermined selection criterion.

As illustrated in FIG. 2, transcoder 20 is installed in remote transcoding server 34 arranged between network client 12 and network 18. Transcoder 20 may alternatively be implemented, for example, as a software module installed in a network proxy, in a client device, in a network server device, or in a content server device. Likewise, transcoding server 34 may comprise, or be a part of, a network server, a stand-alone computer or other data processing device in communication with a network server, or a distributed system of devices. Transcoding server 34 may be coupled, for example, to an ISP's network, a corporate network, or anywhere on network 18, and may provide multiple users (clients) with a means to obtain content on network 18.

In the arrangement shown in FIG. 2, transcoding server 34 includes an HTTP (HyperText Transfer Protocol) remote proxy 36, capable of accessing network 18 over server/network communications link 16. HTTP remote proxy 36 provides functionality different from known network proxies, which generally are little more than a conduit for requests to, and replies from, external Internet resources, in that it is capable not only of examining such requests and replies, but also of acting upon commands in the requests by, for example, determining whether or not to transcode content. Moreover, using transcoder 20, HTTP remote proxy 36 is capable of changing content received from network 18 prior to returning it to a requesting network client 12.

Looking more closely at the arrangement shown in FIG. 2, transcoder 20 is coupled to HTTP remote proxy 36. Parser 22 manages the transcoding of data to be transmitted from transcoding server 34 to network client 12. To this end, parser 22 controls transcode service providers 24 to selectively transcode content based on a predetermined selection criterion. For example, one or more transcode service providers 24 may provide the capability to compress and/or scale different types of data content, such as image, video, or HTML (HyperText Markup Language). Transcoding server 34 may also include a server-side cache memory 30 managed by a server-side cache interface 28. Server-side cache memory 30 may be used to store both original and transcoded versions of content for later transmission to network client 12 without the need to re-retrieve the content from network 18 or to re-transcode the content.

Parser 22 may comprise a relatively simple, uniform interface to HTTP remote proxy 36, and may provide an API (Application Programming Interface) for transcoding data received by HTTP remote proxy 36. Parser 22 manages one or more transcode service providers 24 that are accessed through a common SPI (Service Provider Interface). In this particular implementation, parser 22 is designed in compliance with the Windows Open Systems Architecture (WOSA), and may be implemented as a Win32 DLL (Dynamic Link Library). The WOSA architecture, described in *Readings on Microsoft Windows and WOSA* (Microsoft Corp. 1995), enables additional transcode service providers 24 to be dynamically added to the system to provide new features and/or better transcoding algorithms, while at the same time not requiring changing or retesting other software components in the system. This feature is especially beneficial where transcoding server 34 also interacts with enabled network clients equipped with specialized transcoding software. Transcoding server 34 may advantageously be configured flexibly enough to process requests from both non-enabled and enabled network clients.

Like parser 22, server-side cache interface 28 may be modeled after a standard Get/Set interface. Server-side cache memory 30 essentially "owns" all cached objects, in that it manages the properties and storage of the objects and may invalidate any non-locked object at any time; however, the actual format of any given cached object is known only by parser 22 and its associated transcode service providers 24. Thus, for data integrity and transcoding efficiency purposes, all access to server-side cache memory 30 in this arrangement is through parser 22.

In operation, transcoder 20 may use a Read() call to read data from a specified cached object data stream. For example, transcode service provider 24 may invoke this call and tunnel stream data through HTTP remote proxy 36 directly to network client 12. Similarly, a Write() call may be used to cache data from a new HTTP data stream. This call will append an incoming data stream received from, for example, a Web server or transcode service provider 24, to an opened cache stream which may be concurrently read using the Read() call.

Parser 22 may be configured to include the following calls:
GetObject(URL, InParams, &OutParams, &OutStream, . . .);
GetScaledObject(URL, InParams, &OutParams, &OutStream, Stage, . . .);
PutObject(URL, InParamStruct, &InStream, &OutParams, &OutStream, . . .).

Parser 22 may use such calls to manage the provision of requested content to network client 12. For example, the GetObject() call may be used to service non-enabled client requests, and returns a non-transcoded (original) version of a specified hypertext object. In this arrangement, transcoding server 34 assumes that each HTTP request has a unique thread that may be blocked until the request is satisfied. Accordingly, the GetObject() call will block until it either returns the requested data stream or indicates failure with a cause (e.g., object does not exist). This ability to return a so-called standard hypertext object is advantageous for compatibility reasons, enabling embodiments of the present invention to be used with existing browsers that do not include support for certain transcoding functionality (e.g., advanced data compression), and enabling users to selectively retrieve non-transcoded versions.

The GetScaledObject() call is similar to GetObject(), and is also used to request an object from server-side cache memory 30; however, it adds support for requesting a particular version of that object, such as a high-quality rendition. Unlike traditional caching proxies, transcode service providers 24 can use server-side cache memory 30 to store several different versions of an object to support clients with different communications and/or presentation capabilities. Thus, an additional "Stage" parameter may be used to indicate which version of the cached object is to be returned to network client 12. Where transcode service provider 24 is configured to scale network content, it may use this parameter to request a version of a cached object having, for example, a default scaled quality, a refinement to a better-quality version, or the original non-scaled version.

In this particular arrangement, when network client 12 requests a hypertext object, HTTP remote proxy 36 uses either the GetObjecto or GetScaledObject() call (depending on if network client 12 is capable of receiving scaled/transcoded datatypes) to retrieve the hypertext object from parser 22. If the hypertext object is not found, parser 22 uses the CreateEntry() call to create an entry (in effect, a placeholder) in server-side cache memory 30 for the new object. The new entry is returned to HTTP remote proxy 36, which requests the hypertext object from network 18. As a data stream for the hypertext object is returned, HTTP remote proxy 36 calls parser 22 using the PutObject() call, passing into this call the new entry and the handle to the data stream to be placed into the entry. Parser 22 selects an appropriate transcode service provider 24 based, for example, on the content type of the data stream. In this context, the term content type encompasses a datatype, an HTTP MIME (Multipurpose Internet Mail Extensions) type, a content format, and so on. The selected transcode service provider 24 uses a separate thread to read the incoming data stream, transcode it, and place it within the entry of server-side cache memory 30. The current thread immediately returns to HTTP remote proxy 36, which once again calls GetScaledObject() (or GetObject()). This case will always result in a cache hit. This thread then works substantially simultaneously with the separate thread in the PutObject() to tunnel data (either original or transcoded) from transcoding server 34 to network client 12.

Parser 22 may itself be configured to determine whether network client 12 is enabled or enabled, as described above. Alternatively, parser 22 may pass a message received from network client 12 to a selected transcode service provider 24, which will then make the determination. Yet another possibility is that HTTP remote proxy 36 makes the determination. It should be noted that the present invention is not limited with respect to the particular module within transcoding server 34 that makes the determination, nor to the use of the particular calls discussed herein.

Network client 12 includes a browser 32, such as the Netscape Navigator v.3.0 browser (although the invention is not limited in this respect), which manages the presentation of data to a user. In the illustrated embodiment, network client 12 is "non-enabled," meaning no specialized transcoding software is preloaded on network client 12. Where network client 12 is a non-enabled client residing on a secure network, user preferences may be determined, for example, in the following manner. Network client 12 may be provided with the ability to actively control aspects of the transcoding process, or indeed whether or not to transcode requested content at all. To provide this ability, HTTP remote proxy 36 may embed additional instructions at the beginning of the HTML header for the requested URL prior to transmitting the associated data stream to network client 12. As browser 32 of network client 12 receives the data stream, the embedded instructions will automatically execute so long as browser 32 is equipped to support them. For example, if the embedded instructions are implemented as JavaScript codes, browser 32 may be a JavaScript-enabled browser such as a Netscape Navigator v.2.0 or above browser, or an Internet Explorer v.3.0 or above browser. If browser 32 is not equipped for such HTML scripting, the embedded instructions will not interfere with the browser's 32 normal processing, as such browsers 32 are typically configured to ignore any data they cannot interpret.

Figure 3:
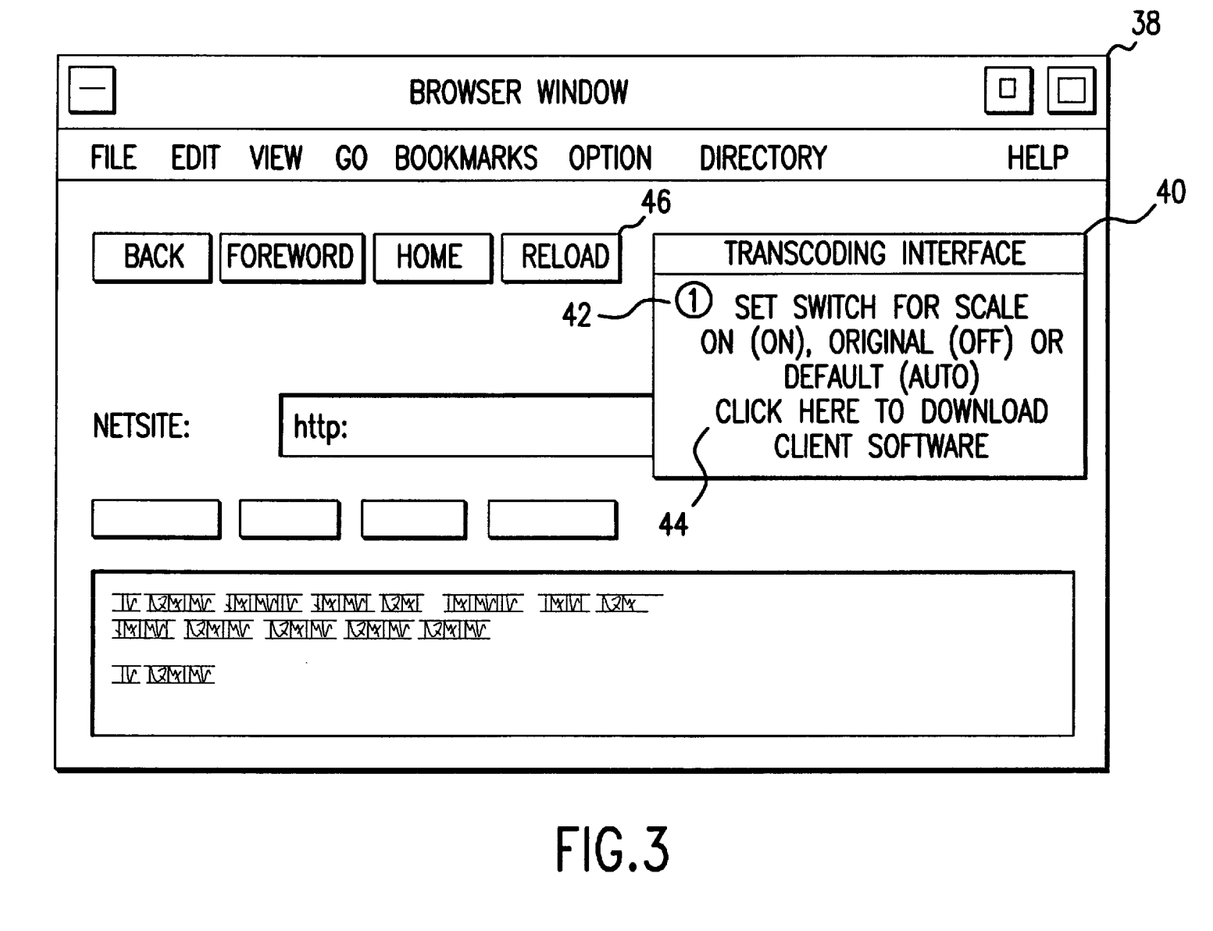
FIG. 3 is a schematic diagram illustrating an example of a user interface for providing a non-enabled network client with control over transcoding functionality.

The embedded instructions transmitted to network client 12 may enable the user to manipulate some of the transcoding capabilities of transcoding server 34. As illustrated in FIG. 3, the embedded instructions may drive a user interface in the form of a pop-up window 40 that is displayed at the top of a browser window 38. In this example, pop-up window 40 includes a three-state switch 42 having "ON," "OFF" and "AUTO" settings, and may also include a hypertext link 44 which the user may follow to download specialized client software supporting, for example, more sophisticated transcoding functionality. The initial setting of three-state switch 42 may be based upon a prior determination by HTTP remote proxy 36 as to whether network client 12 has an established preference for reception of transcoded content. If so, three-state switch 42 may be set to "ON;" if not, three-state switch 42 may be set to "OFF." A goal of this feature is to provide the user with some way of communicating a preference to HTTP remote proxy 36 with regard to aspects of particular transcoding features, such as a content quality/latency tradeoff where the transcoding comprises data compression/scaling. Persons skilled in the art will recognize that this capability may be provided in many other ways, including ways which would enable the user to communicate preferences beyond simply a yes/no indication for transcoding.

In the particular implementation illustrated in FIG. 3, pop-up window 40 enables the user to change his or her preference as to whether transcoded or original content is desired, and communicates such changes to HTTP remote proxy 36. Pop-up window 40 may or may not interact with browser 32, meaning the user's preference will only take effect after setting three-state switch 42 and clicking on the browser's 32 "RELOAD" button 46 to cause browser 32 to request the (transcoded or un-transcoded) content for presentation to the user. Subsequent pages in the current session may then be rendered in accordance with the new setting of three-state switch 42 without further user intervention. Upon receipt, HTTP remote proxy 36 may update user preference table 26 accordingly. As an alternative, pop-up window 40 may be configured to automatically invoke the "RELOAD" operation when the user indicates a change (such as by flipping three-state switch 42). Where browser 32 is a JavaScript-enabled browser, JavaScript instructions inserted by HTTP remote proxy 36 in the HTML document may "POST" the state of three-state switch 42 to HTTP remote proxy 36 and also cause browser 32 to "RELOAD" the current URL.

It is also possible to configure network client 12 to save the state of three-state switch 42 across multiple sessions of browser 32 using a persistent-state mechanism known in the art as a "cookie." In other words, a cookie may be used to store the state of three-state switch 42 persistently. When a new session of browser 32 is initiated by a user, this state information may be read from network client 12 and POSTed by the JavaScript code (inserted at the beginning of the HTML document) to HTTP remote proxy 36 before any content for the requested hypertext object is actually sent to network client 12. This will allow HTTP remote proxy 36 to update user preference table 26 with the correct state of three-state switch 42, and hence send correctly-transcoded content to network client 12. In such an embodiment, the state information may be POSTed to HTTP remote proxy 36 each time a given URL is requested by browser 32. This will allow network client 12 to receive the correctly-transcoded content even if the HTTP remote proxy 36 to which it is coupled changes due to, for example, a change in geographical location of network client 12 or network load-balancing procedures.

According to another implementation, network proxy 10 (see FIG. 1) or transcoding server 34 (see FIG. 2) may be configured to include the embedded code for obtaining user preferences within a reply including a portion of the network object requested by non-enabled network client 12. This alternate implementation may be more efficient where, for example, the network object includes both scaleable data (for example, images) and non-scaleable data (for example, HTTP text that is sent to client device 12 before the scaleable data). In such a case, network proxy 10 or transcoding server 34 may embed the code in the non-scaleable data returned to network client 12 and then await a POSTed message with user preference information before downloading the scaleable data.

Figure 4:
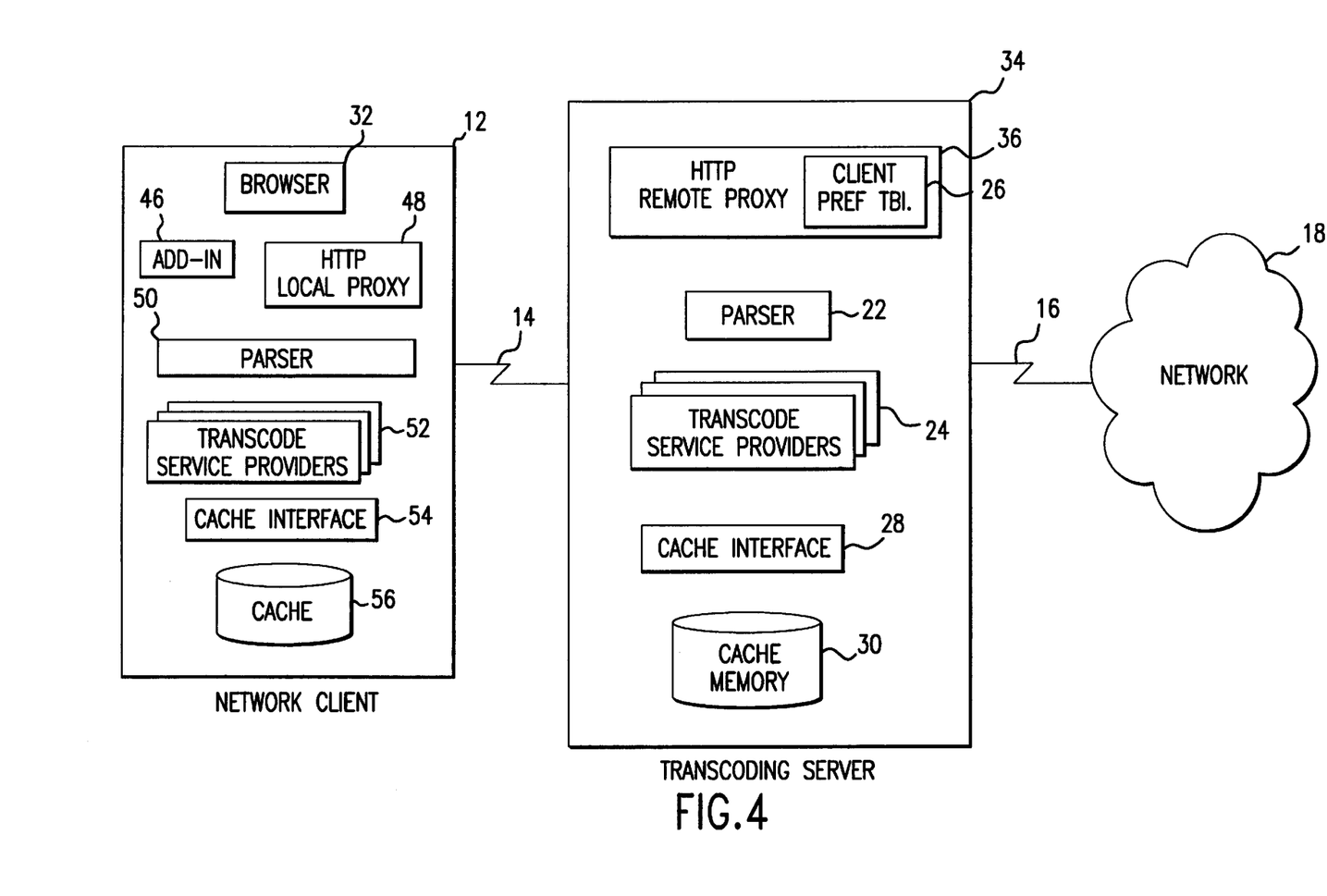
FIG. 4 is a schematic diagram illustrating an arrangement involving an enabled network client to which embodiments of the present invention may be applied.

In contrast to the non-enabled client arrangement illustrated in FIG. 2, FIG. 4 shows an arrangement in which an enabled network client 12 communicates with external network 18 through transcoding server 34. As illustrated, network client 12 includes an HTTP local proxy 48 coupled to a client-side parser 50 which, similar to parser 22 of transcoding server 34, controls one or more client-side transcode service providers 52. Each transcode service provider 52 may be configured, for example, to transcode content before it is rendered to a user or to perform a counterpart transcoding function (e.g., decoding, decompression) with respect to a function performed by a corresponding transcode service provider 24 of transcoding server 34. As in transcoding server 34, network client 12 may include a client-side cache memory 56 managed by a client-side cache interface 54. Client-side cache interface 54 may be an already-existing facility supported by the operating system, such as WININET. Using an existing caching facility reduces the amount of software that is to be downloaded to network client 12, and also allows other applications, such as disconnected browsers, to share client-side cache memory 56.

HTTP local proxy 48, client-side parser 50 and client-side transcode service providers 52 (collectively, the client software) may be downloaded to network client 12 on demand, such as by clicking on hypertext link 44 presented by pop-up window 38 illustrated in FIG. 3. Alternatively, the client software could be distributed to users on a portable storage medium, such as a diskette or CD-ROM, or it may be preloaded on an off-the-shelf personal computer. In the arrangement of FIG. 4, the client software is separate from browser 32; however, in an alternate arrangement (not shown) the client software may be integrated in browser 32.

In the implementation shown in FIG. 4, browser 32 is configured to send all HTTP requests through HTTP local proxy 48, thus allowing HTTP local proxy 48 to improve retrieval and rendering of requested hypertext objects. For example, when HTTP local proxy 48 receives an HTTP request from browser 32 for a hypertext object associated with a Web page, it passes the URL to client-side cache interface 54 to check whether a copy of the hypertext object already exists in client-side cache memory 56. If the hypertext object is cached, HTTP local proxy 48 passes the cached object to browser 32 for rendering. If the requested hypertext object is not cached, HTTP local proxy 48 transmits an HTTP request to transcoding server 34 for processing. In accordance with one particular embodiment of the present invention, HTTP local proxy 48 may use a custom Get() request for this purpose to enable transcoding server 34 to identify network client 12 as enabled. Persons skilled in the art will recognize, however, that other forms of requests and/or information passing may readily be used to permit transcoding server 34 to recognize network client 12 as enabled. Performing the processing described above with reference to other embodiments, transcoding server 34 will return a data stream for the hypertext object to HTTP local proxy 48.

Figure 5:
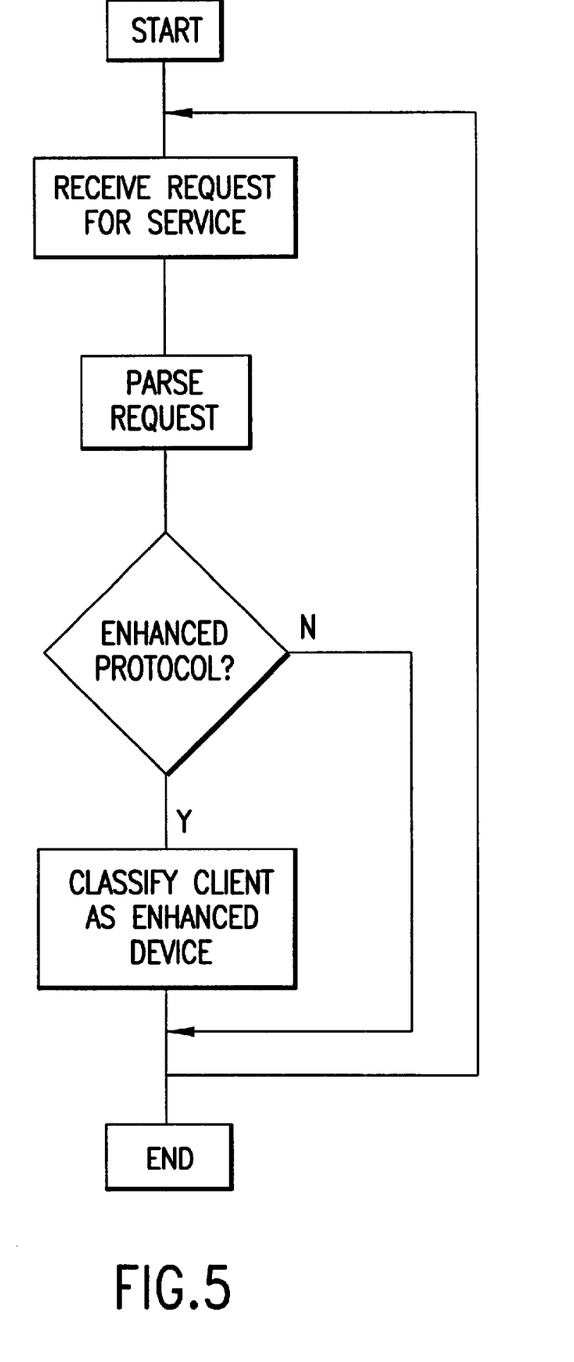
FIG. 5 is a flow diagram illustrating a method according to an embodiment of the present invention.

By way of further illustration, FIG. 5 provides a flow chart describing a method according to an embodiment of the present invention for determining whether a client device that issued a message is pre-configured to receive a response according to an enhanced communications protocol. Processing begins upon receipt of a message from the client device (Step 20). The received message is then parsed to selectively classify the client device as an enhanced device (Step 30). This parsing may involve, for example, checking a predetermined location within the message for user preference information or some predetermined code. If such user preference information is found, the client device is classified as an enhanced device.

Embodiments of the present invention may be distributed, for example, as a set of instructions residing on a storage medium. Such a storage medium might be a memory of a computer; a piece of firmware; a portable storage device, such as a diskette or other magnetic storage device, or a CD-ROM; or any other medium on which it is known to store executable instructions.

Although the present invention has been described with reference to embodiments for accessing data from the Internet, persons skilled in the art will recognize that it is equally applicable to other networking environments. For example, embodiments of the present invention may be used to enhance data communications between a network client computer and an "intranet." An intranet typically is a secure corporate network modeled after the Internet architecture, and generally includes mechanisms for communicating with external networks such as the Internet. Likewise, embodiments of the present invention may be readily adapted for use in introducing a newer version of an (arbitrary) protocol within elements of an existing protocol, so that devices involved in a particular communication are affected only if they are capable of responding to the newer protocol. If one (or more) of the devices is not, such devices would still function correctly pursuant to the original protocol.

Moreover, embodiments of the present invention are not limited to only networking devices and protocols, but instead may be readily applied in many other environments that may require the introduction of devices, systems, programs, or other entities capable of communicating with enhanced protocols while still accommodating existing, unenhanced entities. For example, methods according to the embodiments described herein may be applied to a system bus providing a communications backbone for several components of a computer. Some components may use newer signaling mechanisms (akin to enhanced protocols) enveloped within older, standardized signaling mechanisms (akin to existing, unenhanced protocols). Similarly, such embodiments may be applied to entities other than hardware devices, such as software modules. According to the teachings provided herein, such devices/entities can communicate in enhanced fashion while the unenhanced/existing devices/entities may continue to use their existing methods of communication.

The foregoing is a detailed description of particular embodiments of the present invention. The invention embraces all alternatives, modifications and variations that fall within the letter and spirit of the claims, as well as all equivalents of the claimed subject matter. For example, embodiments of the present invention may be applied to communications protocols other than HTTP. Likewise, the logic for requesting and/or acting upon user preferences for downloading data may be included in devices other than a network proxy, such as a content server, a client device, or a browser installed in a client device. Persons skilled in the art will recognize from the foregoing detailed description that many other alternatives, modifications and variations are possible.

What is claimed is:

1. A method for determining whether a client device that issued a request for a data object is pre-configured to communicate a user preference for transcoding the requested data object prior to returning it to the client device, said method comprising:

receiving a request for a data object from the client device; and parsing the request to selectively classify the client device as an enhanced client device if the request conforms with an enhanced communications protocol, an enhanced client device being a client device that is preconfigured to communicate user preference information affecting a manner in which the requested data object is to be transcoded prior to returning the data object to the client device.

2. The method of claim 1, further comprising determining from said message whether the client device resides behind a network proxy.

3. The method of claim 2, wherein said predetermined code comprises information relating to a user preference for downloading data to the client device.

4. The method of claim 1, wherein said parsing comprises checking a portion of said message for a predetermined code associated with the enhanced communications protocol.

5. An apparatus for determining whether a client device that issued a request for a data object is configured to communicate a user preference for transcoding the requested data object prior to returning it to the client device, said apparatus comprising a set of executable instructions residing on a storage medium for:

receiving a request for a data object from the client device; and parsing the request to selectively classify the client device as an enhanced client device if the request conforms with an enhanced communications protocol, an enhanced client device being a client device that is preconfigured to communicate user preference information affecting a manner in which the requested data object is to be transcoded prior to returning the data object to the client device.

6. The apparatus of claim 5, wherein said apparatus further comprises a network proxy.

7. The apparatus of claim 5, wherein said apparatus further comprises a content server.

8. The apparatus of claim 5, wherein said apparatus further comprises a second client device.

9. The apparatus of claim 8, wherein said apparatus further comprises a browser installed in the second client device.

10. A storage medium including a set of instructions for execution by a network device to determine whether a client device coupled thereto is configured to communicate a user preference for transcoding a requested data object prior to returning it to the client device, said set of instructions including instructions for:

receiving a request for a data object from the client device; and parsing the request to selectively classify the client device as an enhanced client device if the request conforms with an enhanced communications protocol, an enhanced client device being a client device that is preconfigured to communicate user preference information affecting a manner in which the requested data object is to be transcoded prior to returning the data object to the client device.

11. The storage medium of claim 10, wherein said storage medium comprises a magnetic storage device.

12. The storage medium of claim 10, wherein said storage medium comprises a memory of said network device.

13. The storage medium of claim 10, wherein said set of instructions further includes instructions for determining from said message whether the client device resides behind a network proxy.

14. The storage medium of claim 10, wherein said set of instructions further includes instructions for checking a portion of the parsed message for a predetermined code associated with the enhanced communications protocol.

15. The storage medium of claim 14, wherein said predetermined code comprises information relating to a user preference for downloading data to the client device.

* * * * *

UNITED STATES PATENT AND TRADEMARK OFFICE
CERTIFICATE OF CORRECTION

PATENT NO. : 6,311,215 B1
DATED : October 30, 2001
INVENTOR(S) : Bikram Singh Bakshi et al.

Page 1 of 1

It is certified that error appears in the above-identified patent and that said Letters Patent is hereby corrected as shown below:

<u>Column 1,</u>
Line 8, change "Biker S. Bakes" to -- Bikram S. Bakshi --.

Signed and Sealed this

Twenty-first Day of May, 2002

Attest:

*Attesting Officer*

JAMES E. ROGAN
*Director of the United States Patent and Trademark Office*